United States Patent
Zaugg et al.

(10) Patent No.: US 8,425,110 B2
(45) Date of Patent: Apr. 23, 2013

(54) BREGUET OVERCOIL BALANCE SPRING MADE OF SILICON-BASED MATERIAL

(75) Inventors: Alain Zaugg, Le Brassus (CH);
Christophe Bifrare, Le Pont (CH);
Sacha Vorpe, Sonvilier (CH);
Jean-Philippe Thiebaud, Cudrefin (CH); Marc Lippuner, Grenchen (CH)

(73) Assignee: Montres Breguet SA, L'Abbaye (CH)

( * ) Notice: Subject to any disclaimer, the term of this patent is extended or adjusted under 35 U.S.C. 154(b) by 677 days.

(21) Appl. No.: 12/638,509

(22) Filed: Dec. 15, 2009

(65) Prior Publication Data

US 2010/0149927 A1    Jun. 17, 2010

(30) Foreign Application Priority Data

Dec. 15, 2008    (EP) .................................... 08171694

(51) Int. Cl.
*G04B 17/04* (2006.01)
(52) U.S. Cl.
USPC .......................................... 368/177; 368/175
(58) Field of Classification Search ........... 368/175–178
See application file for complete search history.

(56) References Cited

U.S. PATENT DOCUMENTS

| 7,077,562 B2 | 7/2006 | Bourgeois et al. |
| 7,503,688 B2 * | 3/2009 | Hessler et al. ................ 368/169 |
| 7,824,097 B2 * | 11/2010 | Lippuner et al. .............. 368/124 |
| 2005/0281137 A1 | 12/2005 | Bourgeois et al. |
| 2006/0002240 A1 * | 1/2006 | Peters et al. .................. 368/169 |

FOREIGN PATENT DOCUMENTS

| CH | 695 395 | 4/2006 |
| EP | 0 732 635 A1 | 9/1996 |
| EP | 1 422 436 A1 | 5/2004 |
| FR | 2 315 714 | 1/1977 |

OTHER PUBLICATIONS

Reymondin, Charles-Andre et al., The Theory of Horology (Swiss Federation of Technical Colleges 1999), pp. 140 and 141.
Reymondin, Charles-Andre et al., The Theory of Horology (Swiss Federation of Technical Colleges 1999), Chapter 7 and Fig. 7-67.
Théorie Générale de L'Horlogerie,1951, pp. 338-339.
"The Prelude to a Living Watch", printed Dec. 10, 2009 from https://www.iwc.com/jobs/trainee/stage7-en.asp.
"Artisan d'Horlogerie d'Art—Voutilainen," printed Dec. 10, 2009 from http://www.voutilainen.ch/observatoire-2.html.
Search Report issued in the corresponding European application No. 08 17 1694, completed Jun. 10, 2009.

* cited by examiner

*Primary Examiner* — Renee S Luebke
*Assistant Examiner* — Jason Collins
(74) *Attorney, Agent, or Firm* — Griffin & Szipl, P.C.

(57) ABSTRACT

The invention relates to a silicon-based Breguet overcoil balance spring (1, 31) that includes a hairspring (3, 33) made integral coaxially with a collet (5, 35), a terminal curve (7, 37) and an elevation device (9, 39) between the outer coil (15, 45) of the hairspring and the terminal curve. According to the invention, the balance spring has two single parts secured to each other to increase the development precision of the balance spring. The invention also relates to the method of manufacturing the balance spring. The invention concerns the field of timepiece movements.

25 Claims, 3 Drawing Sheets

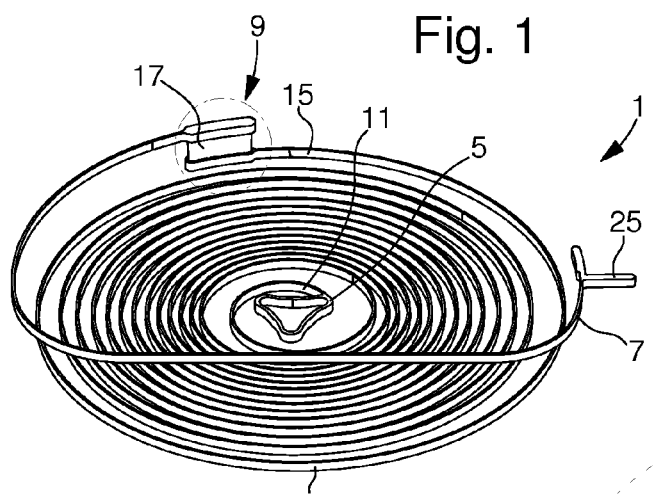
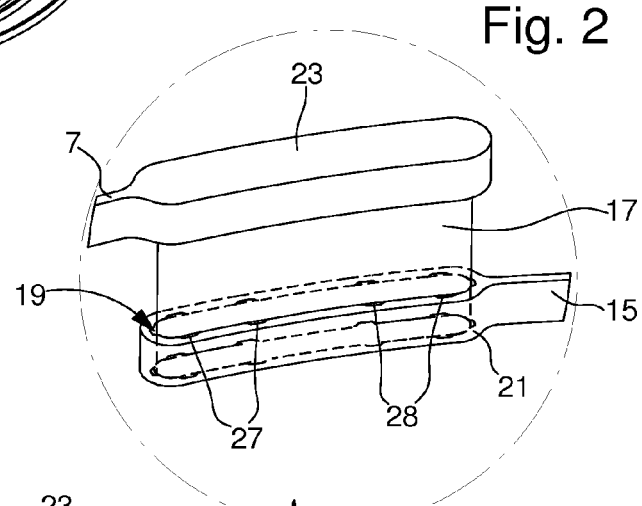
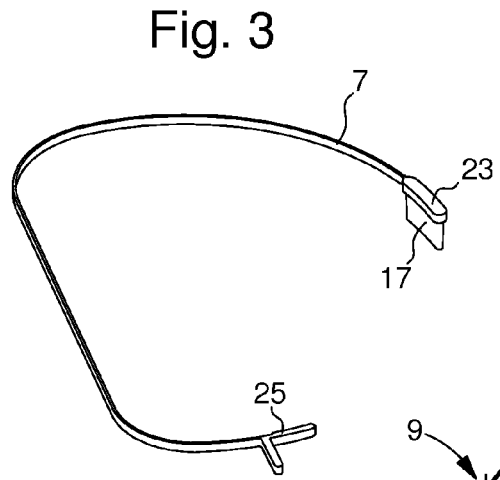
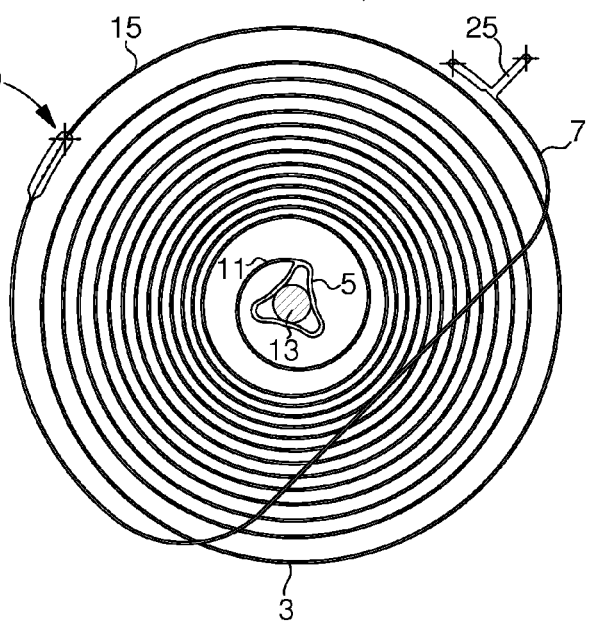

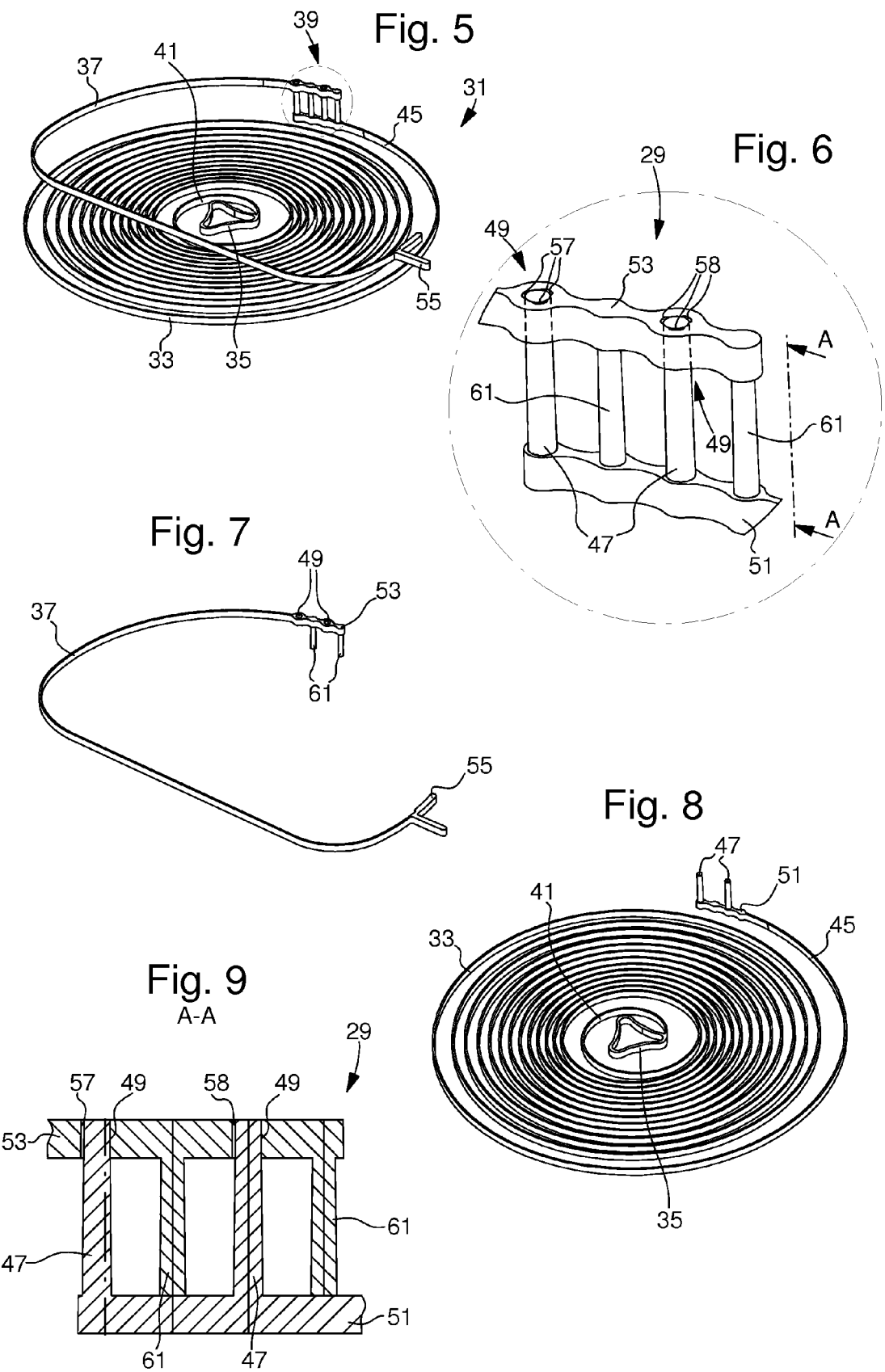

BREGUET OVERCOIL BALANCE SPRING MADE OF SILICON-BASED MATERIAL

This application claims priority from European Patent Application No. 08171694.6, filed Dec. 15, 2008, the entire disclosure of which is incorporated herein by reference.

FIELD OF THE INVENTION

The invention relates to a Breguet overcoil balance spring and the method of manufacturing the same and, more specifically, a balance-spring of this type made from a silicon-based material.

BACKGROUND OF THE INVENTION

The regulating member of a timepiece generally includes an inertia flywheel called a balance and a resonator called a balance spring. These parts determine the working quality of the timepiece. Indeed, they regulate the working of the movement, i.e. they control the frequency thereof.

It is known to fabricate a timepiece part in a silicon-based material. The use of a micro-machinable material, like silicon, has advantages in terms of manufacturing precision, owing to progress in current methods, particularly within the field of electronics. Advantage can also be taken of the very low sensitivity of silicon to magnetism and temperature changes. However, the parts to be made must be flat, as it is not currently possible to make silicon parts with several levels.

SUMMARY OF THE INVENTION

It is an object of the present invention to overcome all or part of the aforementioned drawbacks by proposing a Breguet overcoil balance-spring made of silicon-based material that is simple to manufacture and that allows reduced rate variation.

The invention therefore concerns a Breguet overcoil balance-spring made of silicon-based material that includes a hairspring made in a single part, coaxially with a collet, a terminal curve and an elevation device for the outer coil of the hairspring and the terminal curve, the balance spring including two single parts secured to each other to increase the development precision of the balance spring, characterized in that the elevation device includes at least one post that connects one end of the outer coil to one end of the terminal curve and that is integral with the hairspring-collet assembly or the terminal curve.

Advantageously, a simple assembly is produced from two single parts made in layers of silicon-based material, which is virtually insensitive to magnetism and to temperature change and which no longer requires the complex adjustment steps currently carried out to manufacture this type of balance spring from a metal strip.

According to other advantageous features of the invention:
the elevation device includes at least one additional post that connects one end of the outer coil to one end of the terminal curve and is integral with the terminal curve or the hairspring-collet assembly;
each at least one post is secured in a recess made in the opposite end to that of the at least one post;
the elevation device includes at least one spacer mounted as a reinforcement for the at least one post to maintain a predetermined space between the end of the outer coil and the end of the terminal coil;
the at least one spacer is integral with the terminal curve and/or the hairspring-collet assembly;
assembly of the elevation device is reversed between the hairspring-collet assembly and the terminal curve;
the elevation device further includes securing means for improving the securing force of the at least one post;
the securing means include an adhesive material, an oxide layer of the material or a metal layer;
the balance spring includes at least one silicon oxide portion to make it more mechanically resistant and to improve its thermo-elastic coefficient;
the terminal curve is a Phillips curve to improve the concentric development of the balance spring;
at least one inner coil of the hairspring includes a Grossmann curve to improve the concentric development of the balance spring.

Moreover, the invention relates to a timepiece, characterized in that it includes a Breguet overcoil balance spring according to any of the preceding variants.

Finally, the invention relates to a method of manufacturing a Breguet overcoil balance spring including the following steps:
a) providing a first substrate that includes a top layer and a bottom layer that are silicon-based and connected to each other via an intermediate layer;
b) selectively etching at least one cavity in the top layer to define a terminal curve or a collet integral coaxially with a hairspring;
characterized in that it further includes the following steps:
c) selectively etching at least one cavity in the bottom layer to define at least one post that connects one end of the terminal curve or connects the outer coil of the hairspring;
d) providing a second substrate that has a silicon-based layer;
e) selectively etching at least one cavity in the layer of the second substrate to define a collet made integral coaxially with a hairspring whose outer coil includes at least one recess or a terminal curve, one end of which has at least one recess;
f) assembling the at least one post in the at least one recess to form the Breguet overcoil balance spring.

Advantageously, few steps produce a balance spring made of silicon-based material with improved precision compared to the complex adjustment steps currently carried out for manufacturing this type of balance spring from a metallic strip.

According to other advantageous features of the invention:
the second substrate includes a second, silicon-based material connected to the first by an intermediate layer, and between steps e) and f), the method further includes step g): selectively etching at least one cavity in the second layer of the second substrate to define at least one spacer that can maintain a predetermined space between the hairspring-collet assembly and the terminal curve and/or at least one additional post;
during step c), the etch also defines at least one spacer that can maintain a predetermined space between the hairspring-collet assembly and the terminal curve;
after steps b), c) and e), the method includes step h): oxidising the material to make the Breguet overcoil balance spring more mechanically resistant and to improve the thermo-elastic coefficient thereof;
after step f), the method further includes step i): oxidising the Breguet overcoil balance spring to improve the securing force of the at least one post;
the method further includes, prior to or after step f), step j): depositing an adhesive material between the at least one post and the at least one recess and, further, the final step k): heating the balance spring in order to activate the adhesive material to improve the securing force of the at least one post;

the method further includes, prior to step f), step l): depositing a metal material between the at least one post and the at least one recess for driving the former in against the latter during step f) to improve the securing force of the at least one post;

during or after step f), the method further includes, step m): depositing a braze or soldering material between the at least one post and the at least one hole for driving the former in against the latter to improve the securing force of the at least one post;

the method further includes the final step n): heating the Breguet overcoil balance spring to improve the securing force of the at least one post.

BRIEF DESCRIPTION OF THE DRAWINGS

Other features and advantages will appear more clearly from the following description, given by way of non-limiting illustration, with reference to the annexed drawings, in which:

FIG. 1 is a perspective diagram of a Breguet overcoil balance spring according to the invention;

FIG. 2 is an enlarged view of one part of FIG. 1;

FIG. 3 is a partial view of FIG. 1;

FIG. 4 is a top view of FIG. 1;

FIG. 5 is a perspective diagram of a Breguet overcoil balance spring according to a second embodiment of the invention;

FIG. 6 is an enlarged view of one part of FIG. 5;

FIG. 7 is a partial view of FIG. 5;

FIG. 8 is a partial view of FIG. 5;

FIG. 9 is a diagram of cross-section A-A of FIG. 6

DETAILED DESCRIPTION OF PREFERRED EMBODIMENTS

Figure 10:
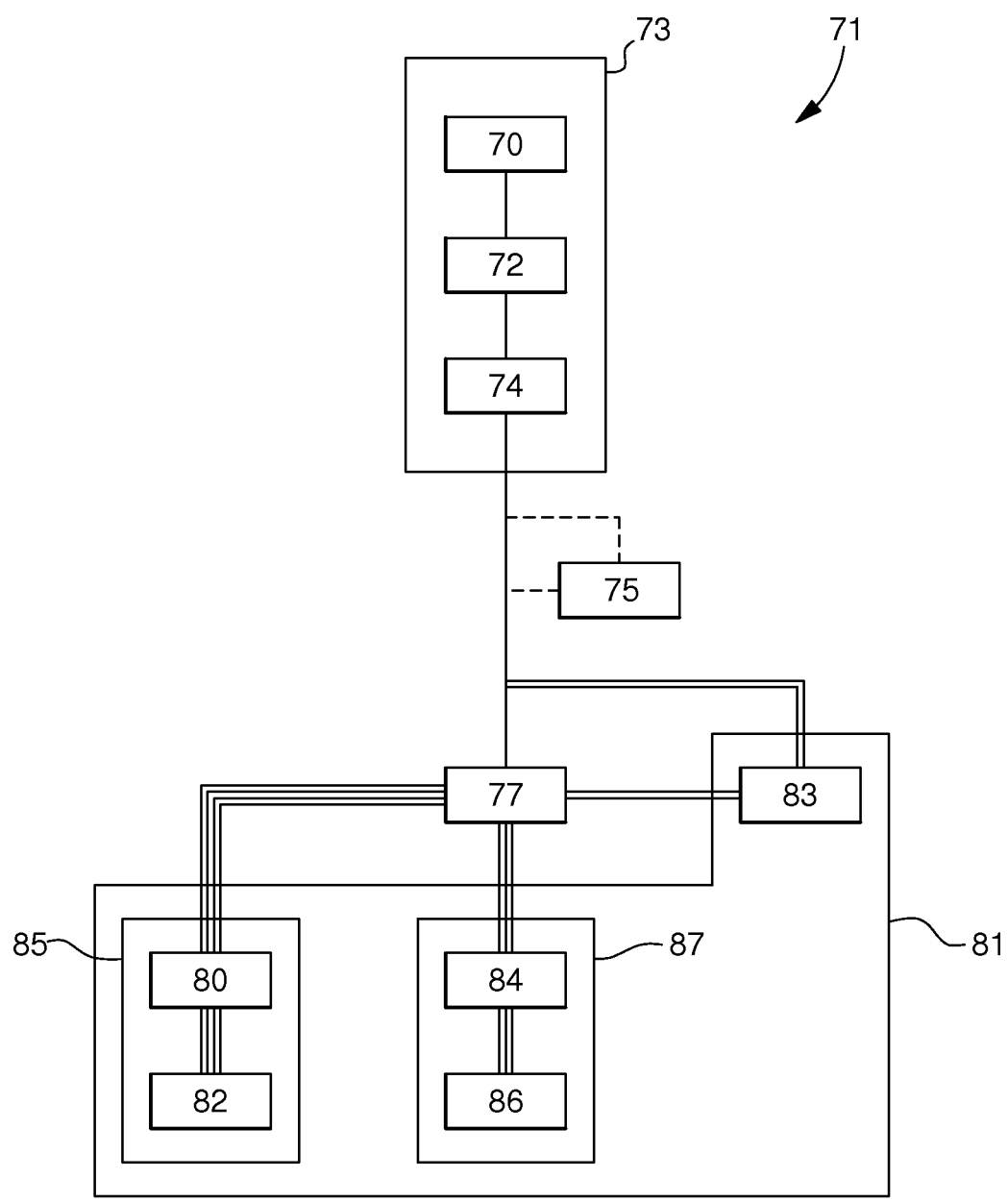
FIG. 10 is a flow chart of the steps of the manufacturing method.

The examples illustrated in FIGS. 1 to 9 show two embodiments of a Breguet overcoil balance spring for assembly in a timepiece in cooperation with a balance. The Figures show, from two embodiments, the possible variants and/or alternatives of a Breguet overcoil balance spring according to the invention. A conventional Breguet overcoil balance spring is disclosed by The Theory of Horology (Swiss Federation of Technical Colleges 1999), pages 140 and 141, which is incorporated herein by reference. The present invention pertains to a Breguet overcoil.

In the example illustrated in FIGS. 1 to 4, according to a first embodiment, balance spring 1 includes a hairspring 3, a collet 5, a terminal curve 7 and an elevation device 9. Hairspring 3 and collet 5 preferably form a single part to prevent imprecision at the interface between them, which could hinder the development symmetry of balance spring 1.

As illustrated in FIGS. 1 and 4, one can see that hairspring 3 preferably has an inner coil 11 comprising a Grossmann curve. A Grossmann curve compensates for the use of a collet 5 by rectifying inner coil 11 relative to the ideal curve of a perfect Archimedes balance spring (See, e.g. Theory of Horology (Swiss Federation of Technical Colleges 1999), Chapter 7 and FIG. 7-67, which is incorporated herein by reference. FIGS. 1 and 4 also show that collet 5 is generally triangular and able to receive a balance staff 13. Of course, the general shape of balance staff 13 and/or of the collet 5 may differ without departing from the scope of the invention.

Preferably, in the example illustrated in FIGS. 1, 3 and 4, terminal curve 7 is a Phillips curve, i.e. a curve which, during the development of balance spring 1, maintains its centre of gravity on balance staff 13 as described by The Theory of Horology (Swiss Federation of Technical Colleges 1999), 140 and 141, which is incorporated herein by reference. Preferably, as illustrated in FIG. 4, the height of terminal curve 7 and hairspring 3 is identical.

Because of the geometrical conformity of terminal curve 7 and the assembly of hairspring 3-collet 5 explained above, the symmetrical development of balance spring 1 is structurally guaranteed, however the manufacturing type and material used must not hinder development.

To guarantee the manufacturing precision of these curves, but also to make balance spring 1 virtually insensitive to magnetism and temperature change, a silicon-based material is used. Advantageously, this is also a micro-machinable material, i.e. a material that can be manufactured with accuracy of less than a micrometer, for example, by deep reactive ion etching (DRIE) a crystalline silicon-based wafer.

Preferably, the silicon-based material may also be coated with its oxide so as to adapt its thermal expansion, but also its thermo-elastic coefficient relative to the balance for finely adjusting the isochronism of the timepiece movement, i.e. for reducing its rate variation to a minimum.

To make Breguet overcoil balance spring 1, an elevation device 9 is used for securing the outer coil 15 of hairspring 3 to terminal curve 7 located above the hairspring. As illustrated in FIGS. 1 to 3, elevation device 9 includes a post 17 integral with terminal curve 7 and a recess 19 made in the thickened end 21 of the outer coil 15 of balance spring 3. As explained below, post 17 is preferably made from a second layer of silicon-based material attached to the layer used to make terminal curve 7, for example using a silicon-on-insulator (SOI).

As illustrated in FIGS. 2 and 3, post 17 is plumb with the thickened end 23 of terminal curve 7. Post 17 has an elliptical section curved in approximately an arc of a circle, which is smaller than the section of thickened end 23 of curve 7 and thickened end 21 of outer coil 15 of hairspring 3. As FIGS. 3 and 4 show, terminal curve 7 has, at its other end, attachment means 25 for cooperating with a fixed point of the timepiece movement, such as, for example, a bridge.

As illustrated in FIG. 2, recess 19 can be seen more clearly at thickened end 21 of outer coil 15 of hairspring 3. The shape of recess 19 is approximately complementary to that of post 17 so that the latter can be slid against the former. Recess 19 thus has an approximately elliptical section, the sides of which have grooves 27 approximately vertical to FIG. 2 for reducing the contact surface between post 17 and recess 19 during assembly, but which also act as a space for inserting securing means 29 as explained below. It is thus clear that while the sections of post 17 and recess 19 are advantageously complementary, they may have a different shape from an ellipsis curved approximately in the arc of a circle.

In the example illustrated in FIGS. 5 to 9, in accordance with a second embodiment, balance spring 31 has a hairspring 33, a collet 35, a terminal curve 37 and an elevation device 39. Hairspring 33 and collet 35 preferably form a single part as in the first embodiment, to prevent imprecision at the interface between them that could hinder the symmetrical development of balance spring 31.

As illustrated in FIGS. 5 and 8, it can be seen that hairspring 33 preferably has an inner coil 41 that includes a Grossmann curve as in the first embodiment. FIGS. 5 and 8 also show that collet 35 is generally triangular and, like collet 5 of the first embodiment, it can receive a balance staff. Of course, the general shapes of the balance staff and/or collet 35 may differ without departing from the scope of the invention.

Preferably in the example illustrated in FIGS. 5 and 7, terminal curve 37 is a Phillips curve as in the first embodiment. Likewise, in a preferred manner, the height of terminal curve 37 and hairspring 33 is identical.

As explained above, balance spring 31 is preferably made of a silicon-based material as in the first embodiment. The silicon-based material can also preferably be coated with its oxide to adapt its expansion but also its thermo-elastic coefficient relative to that of the balance for finely adjusting the isochronism of the timepiece movement, i.e. for reducing its rate variation to a minimum.

In order to make Breguet overcoil balance spring 31, an elevation device 39 is used for securing the outer coil 45 of hairspring 33 to terminal curve 37, which is located above the hairspring. As illustrated in FIGS. 5 to 9, elevation device 39 has two posts 47 made in a single part at the thickened end 51 of hairspring 33, two spacers 61 in a single piece at thickened end 53 of terminal curve 37 and two recesses 49 made in the thickened end 53 of terminal curve 37.

As explained below, posts 47 and spacers 61 are preferably made from a second layer of a silicon-based material attached to that used for making hairspring 33 and terminal curve 7 respectively, for example by using an SOI.

As illustrated in FIGS. 5, 6 and 9, each post 47 is located opposite thickened end 51 of hairspring 33 and has an approximately circular section.

As FIGS. 5 and 7 show, at the opposite end to thickened end 53, terminal curve 37 has attachment means 55 for cooperating with a fixed point of the timepiece movement, such as, for example, a bridge. As illustrated in FIGS. 6, 7 and 9, recesses 49 can be seen more precisely at thickened end 53 of terminal curve 37. The shape of each recess 49 is approximately complementary to a post 47 so that each of posts 47 can be slid against one of recesses 49. It is thus clear that while the sections of one post 47 and its associated recess 49 are advantageously complementary, their shape may be different from a circle or even different from each other to prevent a post 47 being assembled in a recess 49, which is not of complementary shape.

In the example illustrated in FIGS. 6 and 9, recesses 49 thus have an approximately circular section, the sides of which have approximately vertical grooves 57, for reducing the contact surface between each post 47 and its associated recess 49 during assembly, but which also act as a space for the insertion of securing means 29 as explained below.

Preferably, in accordance with a variant of the invention illustrated in the second embodiment, spacers 61 are present between the thickened ends 51 and 53 respectively of hairspring 33 and terminal curve 37 to maintain a predetermined space between them. According to the example illustrated in FIGS. 6, 7 and 9, it can be seen that spacers 61 are made integral with terminal curve 37 and rest against thickened end 51 of hairspring 33. It is thus clear that spacers 61 limit the extent to which posts 47 penetrate their respective recess 49 and, therefore, improve the manufacturing quality of balance spring 31.

One can deduce from reading the second embodiment that the variant including spacers 61 is also applicable to the first embodiment. It is equally clear that spacer(s) 61 and post(s) 17, 47 may be made integral with terminal curve 7, 37 and/or hairspring 3, 33. Similarly, in the absence of spacers 61, at least one post 17, 47 may be present in the assembly of hairspring 3, 33-collet 5, 35 and in terminal curve 7, 37, which means, as explained above with reference to spacers 61, the use of two SOI.

It is also clear that elevation device 9 of the first embodiment is mounted in reverse compared to device 39 of the second embodiment, but with the same advantageous result. Indeed, it may be observed that the location of recesses 19, 49 and posts 17, 47 is reversed between hairspring 3, 33 and terminal curve 7, 37.

Preferably, from the two embodiments explained above, elevation device 9, 39 may also include securing means 29 for improving the securing force of post 17, 47. According to the invention, there are several possible alternatives of the securing means 29 depending upon the method used as explained below. Thus, securing means 29 include at least one layer 28, 58 between each post 17, 47 and its recess 19, 49. As explained above, the at least one layer 28, 58 can be based in grooves 27, 57 and may thus include an adhesive material, a metal material, an oxide or a fused alloy of the materials used or even a braze or solder.

The method 71 of manufacturing a Breguet overcoil balance spring 1, 31 in accordance with the two embodiments of the invention will now be explained with reference to FIG. 10. Method 71 mainly includes a step 73 of manufacturing components and a step 77 of assembling components. Preferably, the method also includes a step 75 of mechanically reinforcing the components and a step 81 of reinforcing the assembly.

As illustrated in FIG. 10, the first step 73 is for manufacturing, during respective phases 70, 72 and 74, the components of the Breguet overcoil balance spring 1, 31, i.e. the assembly of hairspring 3, 33-collet 5, 35, terminal curve 7, 37 and the elevation device 9, 39. Preferably, a dry or wet micro-machining technique will be used in order to manufacture the components very precisely. In the example explained above, the micro-machining may be a deep reactive ion etching type dry anisotropic etch of a crystalline silicon based wafer.

Thus, phase 70 consists first of all in taking a first SOI substrate and a second silicon wafer substrate. Of course, as explained above, in the case of variants that use spacers 61 on the component opposite that including each post and/or that use at least one post 17, 47 on each component, the second substrate will also be of the SOI type.

Phases 72 and 74 then consist in respectively etching the layers of the first substrate and the layer(s) of the second substrate. For each layer, first of all, a protective mask is coated on the layer, for example, using a photosensitive resin photolithography method. Secondly, the mask-layer assembly is subjected to the anisotropic etch, with only the unprotected parts of the layer being etched. Finally, in a third phase, the protective mask is removed. It is thus clear that the protective mask directly determines the final shape of the etched components on each layer.

During phases 72 and/or 74, depending upon the embodiment and/or variant cited above, one may, for example, obtain the terminal curve 7 with post 17 and attachment means 25 of FIG. 3 in a single part from an SOI substrate, terminal curve 37 with spacers 61, attachment means 55 and recesses 49 of FIG. 7 in a single part from an SOI substrate, but also the hairspring 33-collet 35 assembly with posts 47 of FIG. 8 in a single part from an SOI substrate and the hairspring 3-collet 5 assembly with recess 19 of FIGS. 1 and 2 from a single silicon layer.

Advantageously, it is thus easy to manufacture the Breguet overcoil balance spring 1, 31 with existing movement or calibre dimensions. Thus, advantageously, movements or calibres can still be manufactured simply by replacing the metal Breguet overcoil balance spring usually used with the new one 1, 31, manufactured in silicon, with an improvement in the rate variation and quality thereof. One may also conclude that it is possible to etch on each substrate several times in the same components.

Second step 77 is for assembling the components etched in step 73, i.e. the hairspring 3, 33-collet 5, 35 assembly, terminal curve 7, 37 and elevation device 9, 39. First of all, each necessary component is therefore detached from the etched wafer, for example by breaking bridges of material left between each component and its substrate. Secondly, the three components are assembled to make balance spring 1, 31 from two single parts. In this second phase, the end 21, 51 of outer coil 15, 45 is thus fitted into the end 23, 53 of terminal curve 7, 37 using elevation device 9, 39.

Preferably, according to the first embodiment of FIG. 1, at the end of step 77, balance spring 1 has an overall height approximately equal to the thickness of the first substrate used to make terminal curve 7 and post 17.

According to the second embodiment of FIG. 5, at the end of step 77, balance spring 31 has an overall height that is approximately equal to the thickness of the second substrate used to make the hairspring 33-collet 35 assembly and posts 47. Advantageously, owing to spacers 61, during phase 77, the space is guaranteed between the thickened end 51 of outer coil 45 of hairspring 33 and the thickened end 53 of terminal curve 37.

As explained above, method 71 can also include a step 75 of reinforcing the etched components that consists in performing plasma oxidisation in order to create an excessive thickness of surface silicon dioxide. In the example illustrated in dotted lines in FIG. 10, reinforcement step 75 is performed between etching step 73 and assembly step 77, which means that all of the etched layers can be oxidised, i.e. all the components at the same time. Of course, step 75 can also be performed after phases 72 and/or 74.

As explained above, method 71 may also include a step 81 for reinforcing the assembly of the etched components by using securing means 29. In the example illustrated in FIG. 10, three distinct alternative embodiments can be identified, the processes of which are shown using double, triple or quadruple lines.

According to a first alternative of securing means 29, illustrated by a double line in FIG. 10, reinforcement step 81 can consist in depositing, during a phase 83, a layer 28, 58 inside recesses 19, 49 and particularly in grooves 27, 57, so as to allow posts 17, 47 to be driven into the recesses. Thus, this layer 28, 58 could consist of a metallic layer, obtained, for example, by vapour phase deposition. The absence of any plastic domain in silicon may require the use of a layer 28, 58 that can be deformed to prevent posts 17, 47 and/or recesses 19, 49 from breaking, since the driving in force necessary for balance spring 1, 31 to work properly may generate stress greater than the limits of the elastic zone of the silicon.

Of course, alternatively, layers 28, 58 may also be deposited not inside recesses 19, 49, but on the ends of posts 17, 47. It is clear thus, in the example illustrated by a double line in FIG. 10, that in the first alternative, layers 28, 58 have to be deposited prior to assembly step 77. However, the deposition of phase 83 may also consist of a braze layer 28, 58. The braze could then be performed either during assembly step 77 or afterwards.

According to a second embodiment of securing means 29 illustrated by a quadruple line in FIG. 10, assembly reinforcing step 81 may consist, during a process 85, in depositing an adhesive layer 28, 58 between recesses 19, 49 and posts 17, 47, to improve the securing force of the posts. Thus a first phase 80 can consist in depositing an adhesive material at the interface of the assembled parts, then preferably in a second phase 82 heating the assembly in order to activate the adhesive material. Such a layer 28, 58 could then consist for example in a layer of an adhesive polymer.

Of course alternatively, deposition phase 80 can also be achieved before step 77 if the adhesive material in its non activated assembly state is to viscous or not viscous enough. Deposition phase 80 could then be completed inside recesses 19, 49 and/or on the ends of posts 17, 47 before assembly step 77 and preferably heated after assembly step 77 during phase 82. Thus, it is clear, in this second alternative example, that, because of their adhesive power, layers 28, 58 can hold the assembly firmly in place.

According to a third alternative of securing means 29, illustrated by a triple line in FIG. 10, assembly reinforcing step 81 may consist, during a process 87, in forming a joining layer 28, 58 between recesses 19, 49 and posts 17, 47 to improve the securing force of the posts. Thus, a first phase 84 may consist in oxidising, for example by plasma etching, the surface of silicon-based balance spring 1, 31 to form a silicon dioxide gangue that can improve the join between its assembled components, then, preferably in a second phase 86, heating the assembly to perfect the join.

Of course, alternatively, oxidising phase 84 may also be performed before assembly step 77 and replaced by optional oxidisation step 75. Thus, the already oxidised components would be assembled during step 77 and preferably heated during phase 86 to create a single silicon dioxide layer 28, 58 at the interface between recesses 19, 49 and posts 17, 47, in order to improve the securing force of the posts. It will be noted that a hydrophilising phase prior to heating phase 86 improves the step of joining the silicon dioxide layers. It is thus clear, in this third alternative example, that layers 28, 58, like the other two alternatives, permit a reinforcement of the assembly between recesses 19, 49 and posts 17, 47.

Finally, by way of alternative to the third embodiment, one could envisage a process 87 comprising a single phase 86 of heating the silicon components assembled in step 77 to weld the stressed interfaces of the components.

What is claimed is:

1. A Breguet overcoil balance spring made of silicon-based material, wherein the balance spring includes:
    (a) a hairspring made integral coaxially with a collet so as to form a hairspring-collet assembly;
    (b) a terminal curve; and
    (c) an elevation device disposed between an outer coil of the hairspring and the terminal curve, wherein the elevation device includes at least one first post that connects one end of the outer coil to one end of the terminal curve integral with the hairspring-collet assembly.

2. The balance spring according to claim 1, wherein the elevation device further includes at least one second post that connects one end of said outer coil to one end of said terminal curve made in a single piece with said terminal curve.

3. The balance spring according to claim 1, wherein each at least one first post is secured in a recess made in an opposite end to that of said at least one first post.

4. The balance spring according to claim 1, wherein the elevation device has at least one spacer mounted as a reinforcement to maintain a predetermined space between the one end of the outer coil and the one end of the terminal curve.

5. The balance spring according to claim 4, wherein said at least one spacer is made in a single piece with the terminal curve.

6. The balance spring according to claim 4, wherein said at least one spacer is made in a single piece with the hairspring-collet assembly.

7. The balance spring according to claim 1, wherein the elevation device further includes securing means to improve a securing force of said at least one first post.

8. The balance spring according to claim 7, wherein the securing means include an adhesive material.

9. The balance spring according to claim 7, wherein the securing means include a layer of oxide of said silicon-based material.

10. The balance spring according to claim 7, wherein the securing means include a metallic layer that allows said at least one first post to be driven in.

11. The balance spring according to claim 1, wherein the balance spring further includes at least one silicon oxide part to make the balance spring more mechanically resistant and to adjust a thermo-elastic coefficient of the balance spring.

12. The balance spring according to claim 1, wherein the terminal curve is a Phillips curve in order to improve concentric development of said balance spring.

13. The balance spring according to claim 1, wherein at least one inner coil of the hairspring includes a Grossmann curve in order to improve concentric development of said balance spring.

14. A timepiece, wherein the timepiece includes a Breguet overcoil balance spring according to claim 1.

15. A Breguet overcoil balance spring made of silicon-based material, wherein the balance spring includes:
  (a) a hairspring made integral coaxially with a collet so as to form a hairspring-collet assembly;
  (b) a terminal curve; and
  (c) an elevation device disposed between an outer coil of the hairspring and the terminal curve, wherein the elevation device includes one or more posts that connect one end of the outer coil to one end of the terminal curve made in a single piece with the terminal curve, and wherein each post is secured in a recess made in an end of the hairspring-collet assembly.

16. A method of manufacturing a Breguet overcoil balance spring, wherein the method includes the following steps:
  (a) providing a first substrate that includes a top layer and a bottom layer that are silicon-based and connected to each other via an intermediate layer;
  (b) selectively etching at least one cavity in the top layer in order to define a terminal curve;
  (c) selectively etching at least one cavity in the bottom layer in order to define at least one post that connects one end of the terminal curve;
  (d) providing a second substrate that has a silicon-based layer;
  (e) selectively etching at least one cavity in the layer of the second substrate in order to define a collet made integral and coaxially with a hairspring whose outer coil includes at least one recess; and
  (f) assembling the at least one post in the at least one recess to form a Breguet overcoil balance spring.

17. A method of manufacturing a Breguet overcoil balance spring, wherein the method includes the following steps:
  (a) providing a first substrate that includes a top layer and a bottom layer that are silicon-based and connected to each other via an intermediate layer;
  (b) selectively etching at least one cavity in the top layer in order to define a collet made in a single piece coaxially with a hairspring;
  (c) selectively etching at least one cavity in the bottom layer in order to define at least one post that connects an outer coil of the hairspring;
  (d) providing a second substrate that has a silicon-based layer;
  (e) selectively etching at least one cavity in the layer of the second substrate to define a terminal curve, wherein one end of the terminal curve has at least one recess; and
  (f) assembling the at least one post in the at least one recess to form a Breguet overcoil balance spring.

18. The method according to claim 17, wherein the second substrate includes a second silicon-based layer connected to the first layer of the second substrate by an intermediate layer, and the method further includes, between steps (e) and (f), the following step:
  (g) selectively etching at least one cavity in the second layer of the second substrate in order to define at least one spacer that maintains a predetermined space between the hairspring-collet assembly and the terminal curve and at least one additional post.

19. The method according to claim 17, wherein, during step (c), the etch also defines at least one spacer that maintains a predetermined space between the hairspring-collet assembly and the terminal curve.

20. The method according to claim 17, wherein the method further includes, after completion of steps (b), (c) and (e), the following step:
  (g) oxidising material to make said Breguet overcoil balance spring more mechanically resistant and to improve the thermo-elastic coefficient of said Breguet overcoil balance spring.

21. The method according to claim 17, wherein the method further includes, after step (f), the following step:
  (g) oxidising said Breguet overcoil balance spring so as to improve a securing force of said at least one post.

22. The method according to claim 17, wherein the method further includes, during or after step (f), the following step:
  (g) depositing an adhesive material between said at least one post and said at least one recess; and
  wherein the method further includes the following final step:
  (h) heating said balance spring to improve a securing force of said at least one post.

23. The method according to claim 17, wherein the method further includes, before step (f), the following step:
  (g) depositing a metallic material between said at least one post and said at least one recess for driving said at least one post against said at least one recess during step (f) to improve a securing force of said at least one post.

24. The method according to claim 17, wherein the method further includes, during or after step (f), the following step:
  (g) depositing a brazing material between said at least one post and said at least one recess for driving said at least one post against said at least one recess to improve a securing force of said at least one post.

25. The method according to claim 17, wherein the method further includes the following final step:
  (g) heating said Breguet overcoil balance spring to improve a securing force of said at least one post.

* * * * *